Jan. 25, 1927.
P. WEISKE
1,615,665
MEANS FOR CONTROLLING DRIVING MOTORS
Filed July 9, 1925     4 Sheets-Sheet 1
*Fig. 1.*
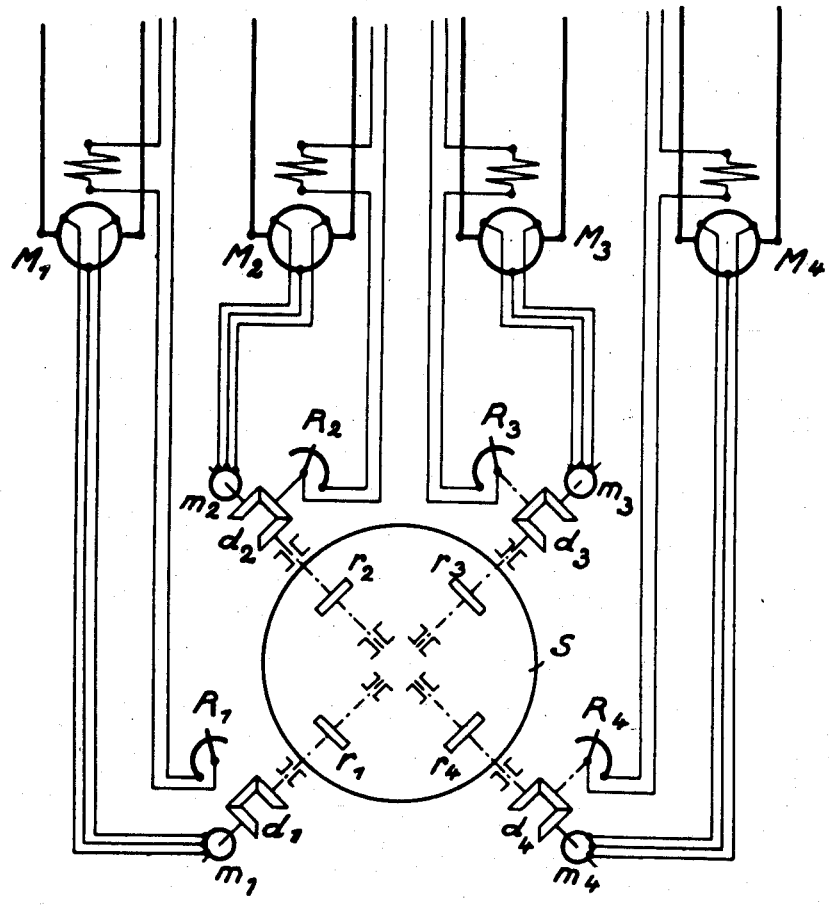
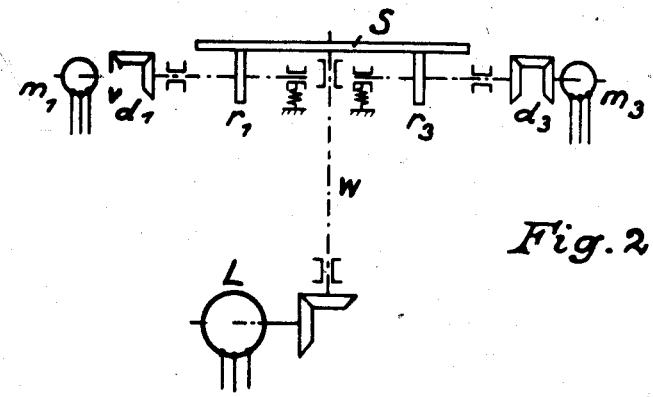
*Fig. 2.*
Inventor:
Paul Weiske,
by *Alexander F. [illegible]*
His Attorney.

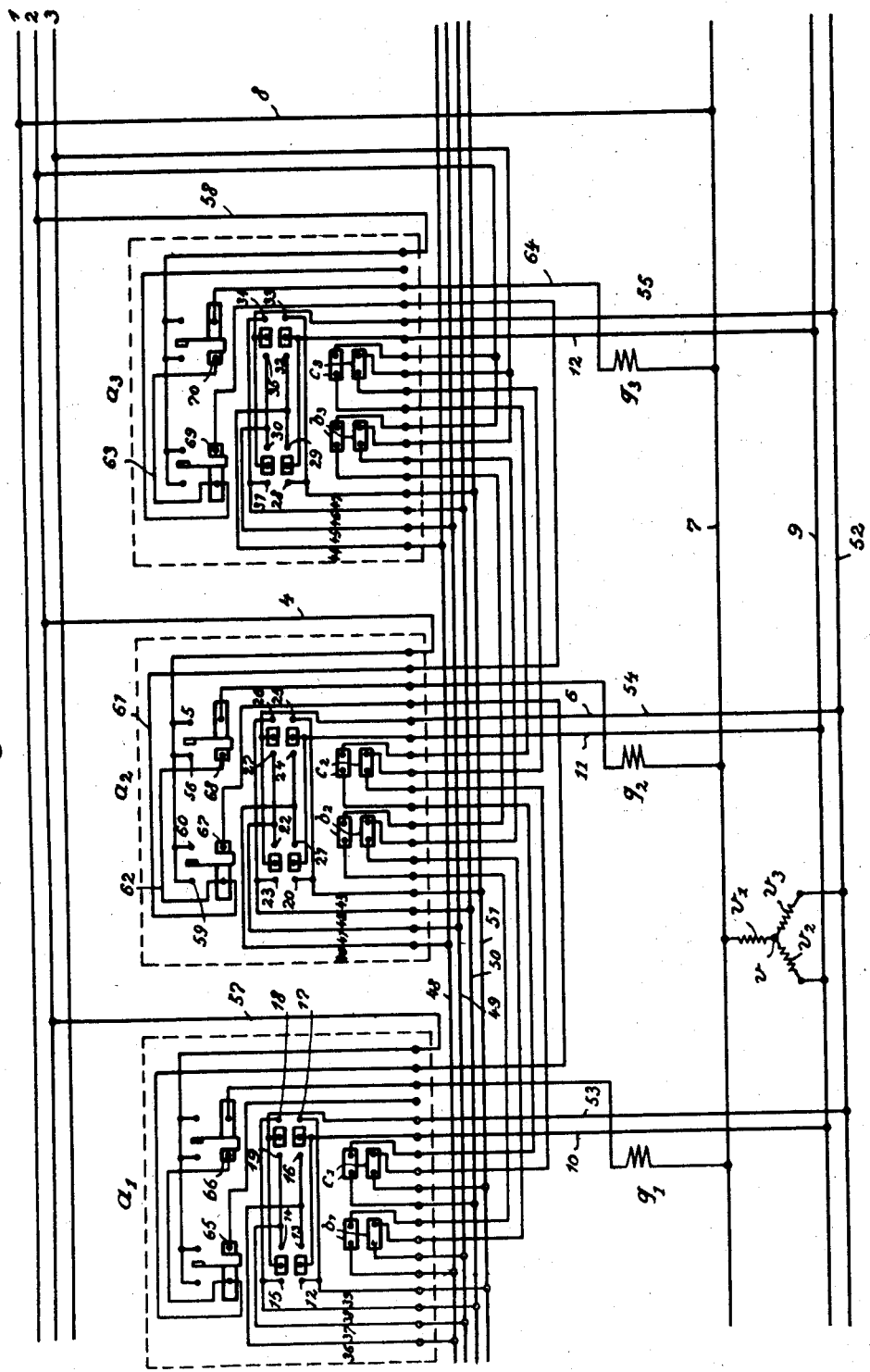

Patented Jan. 25, 1927.

1,615,665

UNITED STATES PATENT OFFICE.

PAUL WEISKE, OF BERLIN, GERMANY, ASSIGNOR TO GENERAL ELECTRIC COMPANY, A CORPORATION OF NEW YORK.

MEANS FOR CONTROLLING DRIVING MOTORS.

Application filed July 9, 1925, Serial No. 42,589, and in Germany July 11, 1924.

My invention refers to means for controlling and regulating the operation of electrically driven machines and apparatus of all kinds in such a manner as to obtain synchronism of a number of such machines or apparatus or to cause them to run or be operated at a predetermined speed.

It more particularly concerns the case in which a machine designed for producing a product of some or other kind is composed of several units or groups which are not rigidly connected with each other and which it is nevertheless desired to control so as to obtain synchronism or running at different predetermined speeds.

For instance a paper making machine consists of several sets of apparatus not rigidly interconnected and each of which has a driving motor of its own. The driving shafts of the different units are designed to be adjusted for different relative speeds which must be maintained automatically by separate regulating devices. As a rule such regulating devices are based on a mechanical or electrical differential effect, one half of the differential being moved in dependency upon the speed of rotation of the shaft to be controlled, while the other half is moved in dependency upon the speed of one of the other driving shafts or with a separate controlling speed and, when the predetermined ratio of speeds is not maintained, will adjust or throw in and out a regulating resistance. The ratio of speeds can be adjusted by varying the ratio of transmission between one half of the differential and the shaft appertaining to it. In many cases small pairs of conical discs with shiftable belts are employed for this purpose.

In the installations hitherto in use these regulating devices are mounted on the driving side of the machine in close proximity to the respective driving motors, which means that they are spaced apart relatively great distances. In order to attend the regulating devices the attendant must pass to the driving side of the machine or else separate means must be provided for transmitting power from the attendant's stand to the driving side. It is however desirable that all the regulating devices can be manipulated in the simplest possible manner and are always easily accessible and can easily be observed by the attendant.

It is an object of my invention to provide means whereby these latter conditions can be fulfilled in a perfect manner.

In the drawings affixed to the specification and forming part thereof, several installations embodying my invention are illustrated diagrammatically by way of example. In the drawings, Fig. 1 is a plan view and Fig. 2 an elevation illustrating one modification.

Fig. 6 is a diagram of connection appertaining thereto.

Referring first to Figs. 1 and 2, S is a rotary disc, the speed of rotation of which represents the controlling speed. This disc can be driven either by one of the driving shafts or by a separate motor L. The disc drives friction discs $r_1$, $r_2$, $r_3$, $r_4$, mounted on shafts which are resiliently supported at one end, these shafts transmitting power unto one half of the differential gears $d_1$, $d_2$, $d_3$, $d_4$, appertaining thereto. The other half of the differential gears is driven each by a small electromotor $m_1$, $m_2$, $m_3$, $m_4$, the speed of these motors being dependent upon the speed of rotation or upon an electric function of the respective driving motor $M_1$, $M_2$, $M_3$, $M_4$, mounted on one of the units forming the machine proper. Provided that the distance of all friction discs $r_1$, $r_2$, $r_3$, $r_4$, from the axis of rotation of disc S be the same, then the wheels of the differential gears coupled with the friction discs will rotate with equal speed. If the other wheels of the differential gears, which are driven in the opposite direction by the motors $m_1$, $m_2$, $m_3$, $m_4$, rotate at the same speed then the spindles of the intermediate wheels of the differential gears will remain stationary.

If, however, the differential wheels driven by the motors $m_1$, $m_2$, $m_3$, $m_4$, rotate at a greater or smaller speed than the differential wheels connected with the friction discs $r_1$, $r_2$, $r_3$, $r_4$, and driven by disc S, the spindles of the intermediate wheels will be turned in one or the other sets and this turning movement is transmitted in a manner well known per se by way of the movable casing of the differential gear and by means of toothed wheels or chains or in some other manner to the contact crank arms of the field regulators $R_1$, $R_2$, $R_3$, $R_4$, whereby the field of the motors $M_1$, $M_2$, $M_3$, $M_4$, is weakened or strengthened and synchronism of these motors is thus brought about.

If, as required for instance in paper making machines, the motors $M_1$, $M_2$, $M_3$, $M_4$, are required to rotate with different speeds, the predetermined relative ratio of speeds being however required to be automatically maintained, then the distance of the friction discs $r_1$, $r_2$, $r_3$, $r_4$, from the axis of disc S need merely be varied, whereby the speed of rotation of the motors $M_1$, $M_2$, $M_3$, $M_4$, is governed as desired.

The speed control can be obtained in a simpler and more advantageous manner if the mechanical differential gears mentioned above are replaced by electrical regulating means which are also set operating by differences of speed.

Figure 3:
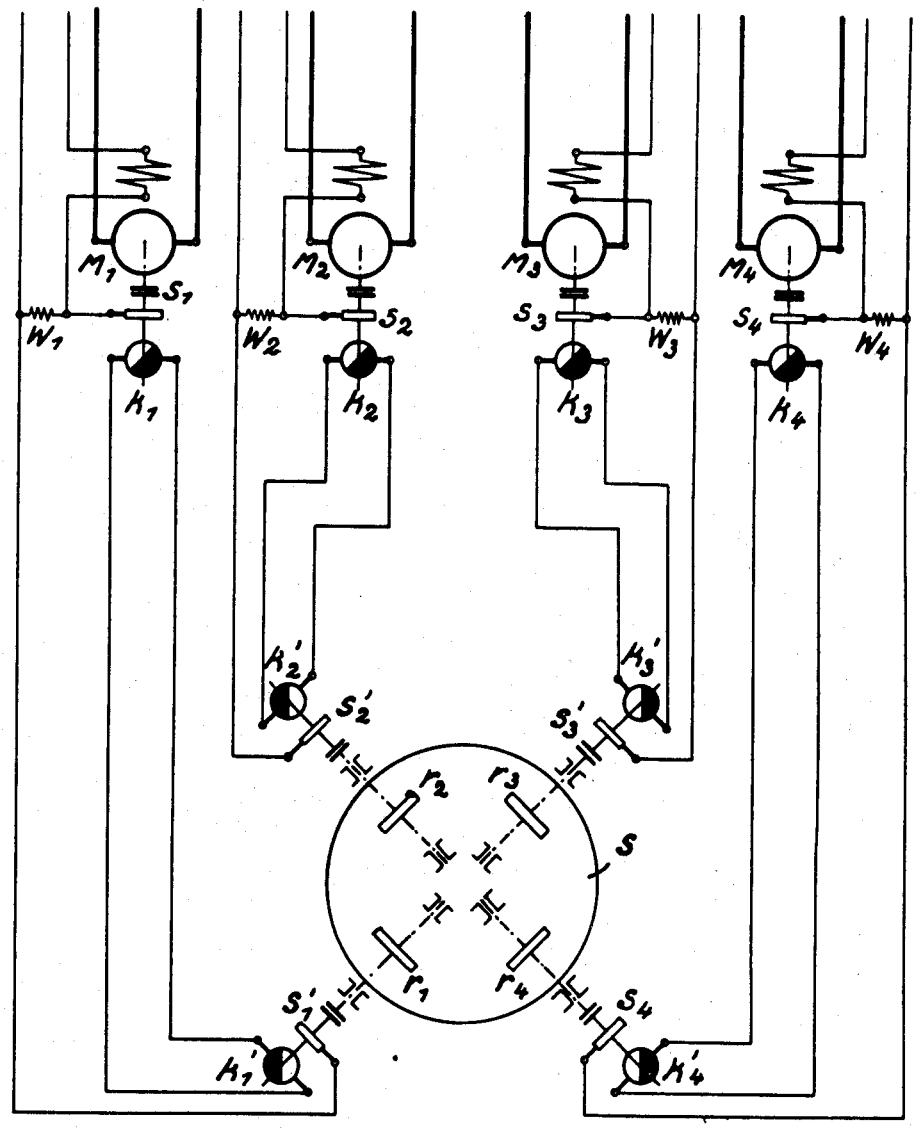
Fig. 3 is a plan view showing an installation in which the mechanical differential gears shown in Fig. 1 are replaced by electrical regulating means.

An installation of this latter kind is illustrated in Fig. 3. In this installation no separate alternating or three-phase current motors $m_1$, $m_2$, $m_3$, $m_4$, are required, such as are provided in the installation illustrated in Fig. 1 for transmitting the speed of the driving motors $M_1$, $M_2$, $M_3$, $M_4$, to the corresponding members of the mechanical differential gears. In consequence thereof also the means required for feeding the motors $m_1$, $m_2$, $m_3$, $m_4$, such as for instance tappings of the motors $M_1$, $M_2$, $M_3$, $M_4$, and separate current generators coupled therewith can be dispensed with.

Each half of the differential regulating devices illustrated in Fig. 3 consists of a collector $k_1$, $k_2$, $k_3$, $k_4$, and $k'_1$, $k'_2$, $k'_3$, $k'_4$, respectively, the current conducting segments of which are connected with a slip ring $s_1$, $s_2$, $s_3$, $s_4$, and $s'_1$, $s'_2$, $s'_3$, $s'_4$, respectively. The contact brushes acting on the collectors of the two halves of the differential are interconnected by wires. Synchronism of the collectors $k_1$, $k_2$, $k_3$, $k_4$, and $k'_1$, $k'_2$, $k'_3$, $k'_4$, is effected thereby so that whenever the ratio of speeds predetermined by adjusting the friction discs $r_1$, $r_2$, $r_3$, $r_4$, is disturbed, the excitation of the motors $M_1$, $M_2$, $M_3$, $M_4$, is varied by throwing in or short-circuiting the resistances $W_1$, $W_2$, $W_3$, $W_4$, thereby regulating the speed of rotation of the motors in dependency upon the speed of rotation of the disc S.

Inasmuch as the two halves of the differential are connected with the brushes merely by the wires they may be spaced apart any desired distance and it is thus rendered possible to operate each half directly from the working motors without any transmission mechanism being inserted between them, whereby the installation as a whole is rendered simpler and more exact in operation.

Obviously the arrangement above described can be used in all other cases where the variation of the relative ratio of speeds is effected by means of conical friction gears.

The variation of the ratio of speeds of the single driving shafts by displacing the friction discs $r$ relatively to disc S can either be effected by hand by means of levers or spindles and hand wheels or else by remote control with the aid of press buttons mounted on the attendant's stand or at other suitable points.

Figure 4:
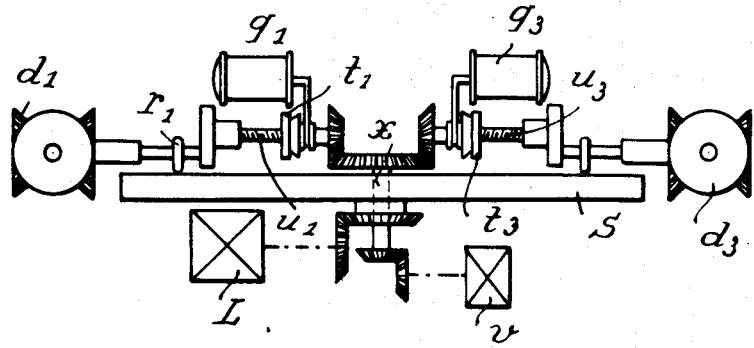
Figs. 4 and 5 are an elevation and plan view respectively of the installation provided with means for a remote electric control of the regulating devices.
Figure 5:
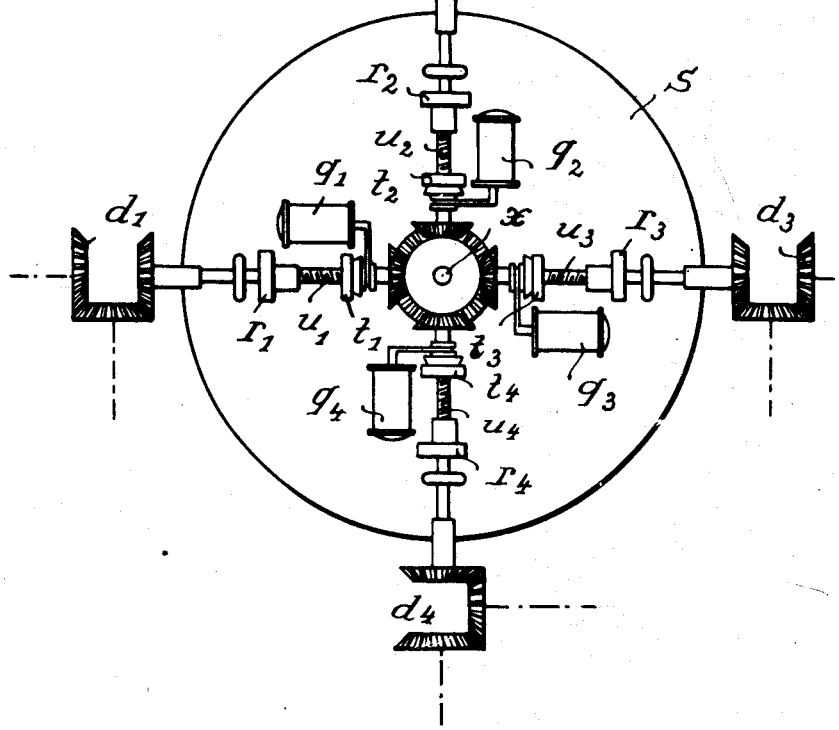

This is illustrated by way of example in Figs. 4-6, where S is the disc governing the friction discs or rollers $r_1$, $r_2$, $r_3$, $r_4$, and L is an electromotor driving disc S. The friction discs $r_1$, $r_2$, $r_3$, $r_4$, are displaced by an auxiliary motor $v$ which is connected with these discs or rollers by means of a shaft $x$ extending in the axis of disc S, suitable bevel gearings, elements $t_1$, $t_2$, $t_3$, $t_4$, and spindles $u_1$, $u_2$, $u_3$, $u_4$. Between these spindles $u_1$, $u_2$, $u_3$, $u_4$, and the elements $t_1$, $t_2$, $t_3$, $t_4$, is inserted a disengageable clutch which is influenced by controlling magnets $q_1$, $q_2$, $q_3$, $q_4$.

In order to displace the friction discs or rollers $r_1$, $r_2$, $r_3$, $r_4$, the motor $v$ and the controlling magnet of the respective friction disc must be thrown in. Those friction discs, whose controlling magnet is not excited, are not displaced. If all the magnets are excited simultaneously, all the discs can be displaced uniformly. Means can, however, also be provided for controlling the motor and the magnets by means of a switch for each magnet, such switch having two switch positions, in one of which it excites only the controlling magnet appertaining to it, while in the other position it excites this magnet and at the same time also all other controlling magnets.

An arrangement of this kind is illustrated in Fig. 6, where $v$ is the auxiliary motor for displacing the friction discs or rollers, switches $a_1$, $a_2$, $a_3$, being provided for connecting this motor with the three-phase system 1, 2, 3. $q_1$, $q_2$, $q_3$, are the windings of the controlling magnets which can also be connected with the three-phase system by way of the switches $a_1$, $a_2$, $a_3$. Each switch comprises a single switch shown on the right-hand side, a group switch shown on the left-hand side and the locking contacts $b_1$, $c_1$, $b_2$, $c_2$, $b_3$, $c_3$, shown farther below. These contacts are so arranged that when the single switches are moved to the left or all the group switches to the right, the contacts $c$ of the respective switch are opened while, when the single switches are moved to the right and the group switches to the left, the contacts $b$ of the respective switch are opened.

The single switch and the group switch are so locked relative to each other that, if one of them is thrown in, the circuit of the other is interrupted.

For instance if the single switch of switch $a_2$ is moved to the left, at first the controlling magnet $q_2$ is excited on the following way: From the phase 2 of the three-phase system through wire 4, contact 5 and wires 6, 7, 8 to the phase 1. At the same tome motor $v$ is for instance thrown in clockwise, the phase $v_1$ being connected through wires 7 and 8 with the phase 1 of the system. The phase $v_2$ is connected with the phase 2 of the system through wires 9, 11, contact 24, wires 40, 48, upper locking-contacts $b_1$, upper locking-contacts $b_2$, upper locking-contacts $b_3$. The phase $v_3$ is connected to the phase 3 of the system through wires 52, 54, contact 27, wires 41, 49, lower locking-contacts $b_1$, lower locking contacts $b_2$, lower locking contacts $b_3$.

If the single switch of switch $a_2$ is moved to the right, the controlling magnet $q_2$ is again thrown in. The flow of current is substantially the same as before, however, connection betwen the wires 4 and 6 is not made by way of contact 5, but by way of contact 56. At the same time the phase contacts $v_2$ and $v_3$ of the auxiliary motor $v$ are exchanged with regard to the connection previously described and in consequence thereof the motor now rotates in the opposite direction. The phase $v_2$ is connected with the phase 3 of the system through wires 11, contact 25, wires 43, 51, lower locking-contacts $c_1$, lower locking-contacts $c_2$, lower locking-contacts $c_3$.

The phase $v_3$ is connected with phase 2 of the system through wires 52, 54, contact 26, wires 42, 50, upper locking- contacts $c_1$, upper locking-contacts $c_2$, upper locking-contacts $c_3$.

If, while the single switch of switch $a_2$ is thrown in on the righthand side, the single switch of switch $a_1$ was also thrown in on the righthand side, the controlling magnet $q_1$ would be excited through wires 57, 7, 8. At the same time current would be supplied to auxiliary motor $v$ not only through wires 11, 54, but also in parallel to them through wires 10, 53 and contacts 17, 18, and the discs or rollers $r_1, r_2, r_3, r_4$, would be simultaneously moved in the same direction.

If, however while the single switch of switch $a_2$ is thrown in on the righthand side the single switch of switch $a_1$ were thrown in on the lefthand side magnet $q_1$ would again be excited, but now motor $v$ would come to a standstill inasmuch as the connection through contacts 25, 26 and locking-contacts $c_1$, which are now open, would be interrupted and a connection by way of the contacts 17, 18 could not be established owing to the locking-contacts $b_2$ being open.

If instead of the single switch of switch $a_2$ the group switch is thrown in on the lefthand side, the controlling magnet $q_2$ will be excited through wire 4, contact 59, wires 62, 6, 7, 8, and at the same time the controlling magnet $q_3$ will be excited through wires 4, 61, 63, 64, 7 and 8. Besides this the motor $v$ will be thrown in for anti-clockwise rotation, phase $v_2$ being connected with phase 3 of the system through wires 9, 11, contact 20, wires 43, 51, and lower locking-contacts $c_1$, lower locking-contacts $c_2$, lower locking-contacts $c_3$, while the phase $v_3$ is connected to the phase 2 of the system through wires 52, 54, contact 23, wires 42, 50, and upper locking-contacts $c_1$, upper locking-contacts $c_2$, upper locking-contacts $c_3$.

If the group switch of switch $a_2$ is thrown in on the righthand side, controlling magnets $q_2, q_3$, are excited and at the same time motor $v$ is thrown in for clockwise rotation. The flow of current can easily be ascertained in accordance with the indications given above.

It is further easy to see that, if several switches, no matter whether they are group switches or single switches, are thrown in simultaneously and if all switches connect the motor $v$ with the system in the same sense the motor will continue rotating, while, if the several switches thrown in simultaneously connect the motor with the system in a different sense and thus cause a short circuit to be established, the motor will be cut off from the system by the locking-contacts $b_1, b_2, b_3$, and $c_1, c_2, c_3$.

Obviously if several group switches or a group switch and a single switch are thrown in simultaneously, wrong connections are rendered impossible by the fact that when the switches are thrown in on the righthand or on the lefthand side, the contacts 65, 66, 67, 68, 69, 70 will interrupt the respective connections.

I wish it to be understood that I do not desire to be limited to the exact details of construction, shown and described, for obvious modifications will occur to a person skilled in the art.

I claim:—

1. Means for controlling the working speed of motor-driven cooperating machines comprising a separate differential gearing operatively connected with each motor and a common driving disc arranged to act on all said differential gears.

2. Means for controlling the working speed of motor-driven cooperating machines comprising a separate differential gearing for each machine, one half of such gearing being connected with the motor to which it appertains, and a common driving disc acting on the other halves of said differential gearings.

3. Means for controlling the working speed of motor-driven cooperating machines comprising a separate differential gearing operatively connected with each motor, a common driving disc arranged to act on all said differential gears and a friction disc operatively connected with one of said gearings, said friction disc being in operative contact with and radially displaceable relative to said driving disc.

4. Means for controlling the working speed of motor-driven cooperating machines comprising a separate differential gearing operatively connected with each motor, a common driving means arranged to act on all said differential gears and means operative from a distance for varying the ratio of speed transmitted from said driving means to one of said gearings.

5. Means for controlling the working speed of motor-driven cooperating machines comprising a separate differential gearing operatively connected with each motor, a common driving means arranged to act on all said differential gears and electric means operative from a distance for varying the ratio of speed transmitted from said driving means to one of said gearings.

In testimony whereof I affix my signature

PAUL WEISKE